United States Patent [19]

Parker

[11] Patent Number: 4,484,228

[45] Date of Patent: Nov. 20, 1984

[54] SIGNAL PROCESSING NETWORK FOR AN AUTOMATIC KINESCOPE BIAS CONTROL SYSTEM

[75] Inventor: Robert P. Parker, Indianapolis, Ind.

[73] Assignee: RCA Corporation, New York, N.Y.

[21] Appl. No.: 434,314

[22] Filed: Oct. 14, 1982

[51] Int. Cl.³ .................... H04N 5/68; H04N 9/16
[52] U.S. Cl. ...................... 358/243; 358/74
[58] Field of Search .......... 358/242, 243, 29, 33, 358/34, 171, 74

[56] References Cited

U.S. PATENT DOCUMENTS

| | | | |
|---|---|---|---|
| 3,872,395 | 3/1975 | Holland | 330/86 |
| 4,055,777 | 10/1977 | Black | 307/360 |
| 4,112,460 | 9/1978 | Arnsson | 358/29 |
| 4,207,592 | 6/1980 | Harwood | 358/33 |
| 4,263,622 | 4/1981 | Hinn | 358/242 |
| 4,277,798 | 7/1981 | Hinn | 358/33 |
| 4,331,981 | 5/1982 | Parker | 358/243 |
| 4,331,982 | 5/1982 | Parker | 358/243 |
| 4,414,577 | 11/1983 | Tallant et al. | 358/242 |
| 4,450,476 | 5/1984 | Tallant | 358/243 |

Primary Examiner—John C. Martin
Assistant Examiner—Michael D. Parker
Attorney, Agent, or Firm—Eugene M. Whitacre; Paul J. Rasmussen; Ronald H. Kurdyla

[57] ABSTRACT

An automatic kinescope bias (AKB) control system includes a sampling amplifier which provides an output current for charging and discharging a storage capacitor in response to the amplitude of a derived pulse representative of the black current level conducted by the kinescope of a television receiver. The derived pulse amplitude is greater than zero when the black current level is correct, and is applied to the amplifier via an input signal coupling path. During sampling intervals, an auxiliary pulse is applied to the input signal path with a magnitude and sense for negating the amplitude of the derived pulse at the amplifier input when the derived pulse amplitude corresponds to the correct black current level. Accordingly, the amplifier conduction and the voltage on the storage capacitor remain unchanged.

14 Claims, 5 Drawing Figures

SIGNAL PROCESSING NETWORK FOR AN AUTOMATIC KINESCOPE BIAS CONTROL SYSTEM

This invention concerns a signal processing arrangement employed in a system for automatically controlling the level of black image representative current conducted by a video signal image display device such as the kinescope of a television receiver.

Television receivers sometimes employ an automatic kinescope bias (AKB) control system for automatically establishing proper black image representative current levels for each electron gun of the kinescope. As a result of this operation, pictures reproduced by the kinescope are prevented from being adversely affected by variations of kinescope operating parameters (e.g., due to aging and temperature effects). One type of AKB system is disclosed in U.S. Pat. No. 4,263,622 of Werner Hinn, titled "Automatic Kinescope Biasing System."

An AKB system typically operates during image blanking intervals, at which time the kinescope conducts a small black level representative blanking current in response to a reference voltage representative of black video signal information. This current is monitored by the AKB system to generate a kinescope bias correction voltage representing the difference between the sensed black current level and a desired black current level. The correction voltage is applied to the kinescope, such as via video signal processing circuits preceding the kinescope, with a sense for reducing the difference. Typically, the correction voltage is applied to a bias control input of a DC coupled kinescope driver amplifier which supplies video output signals of a level suitable for directly driving a cathode intensity control electrode of the kinescope. The correction voltage modifies the output bias voltage of the driver amplifier, thereby modifying the cathode bias voltage, such that the desired cathode black current level results.

In an AKB system of the type described in the aforementioned Hinn patent, control circuits respond to a periodically developed voltage pulse with a magnitude representative of the cathode black current level. The voltage pulse exhibits a prescribed level other than zero when the black current level is correct, and different levels (e.g., more or less positive) when the black current level is too high or too low. The voltage pulse is sampled by a sampling amplifier which charges or discharges a storage capacitor in accordance with the level of the voltage pulse. The kinescope bias correction voltage is derived from the charge stored by the storage capacitor, which increases or decreases as required to maintain a correct black current level.

The bias correction voltage derived from the storage capacitor should remain unchanged when the level of the voltage pulse represents a correct black current level. This requires that the storage capacitor be neither charged nor discharged by output current from the sampling amplifier when the level of the voltage pulse represents a correct black current level. More specifically, in an AKB system of the type described in the Hinn patent, this requires that the sampling amplifier supply no current to the storage capacitor when correct kinescope black level current is indicated by a representative voltage pulse with a predetermined magnitude other than zero. This result can be accomplished by offsetting the bias of the sampling amplifier such as by means of a pre-set, manually adjustable potentiometer coupled to an appropriate bias control point of the amplifier.

It is herein recognized that such manual pre-set adjustments are undesirable in an otherwise automatic signal control system. Furthermore, such manual adjustments are undesirably time consuming, and the associated potentiometers add unwanted cost to the system.

It is also noted that the signal processing techniques employed by some AKB systems can produce an offset error if the cut-off voltages and signal gains of the individual kinescope electron guns are not identical, due to kinescope manufacturing tolerances, for example. In such case the black current level established by the AKB system can exhibit an error which can be compensated for by means of pre-set manually adjustable potentiometers. The disclosed arrangement advantageously facilitates the design of AKB signal processing circuits which do not require manually adjustable controls for the purpose of compensating for such offset errors.

The present invention concerns a video signal processing system wherein a derived signal representative of the black current level conducted by an image display device has a given amplitude other than zero when the black current level is correct. The derived representative signal is applied via an input signal coupling path to a sampling amplifier which supplies an output current for charging and discharging a charge storage device in accordance with the amplitude of the derived signal. In accordance with a principle of the present invention, an auxiliary signal is applied to the input signal coupling path with a magnitude and sense for negating the amplitude of the derived signal at the amplifier input when the amplitude of the derived signal is representative of a correct black current level. Accordingly, the conduction of the sampling amplifier remains unchanged when the derived pulse amplitude corresponds to the correct black current level, and the voltage on the storage device remains unchanged.

In accordance with a feature of the invention, the magnitude of the auxiliary signal is proportional to the magnitude of the cut-off potential of the kinescope cathode developed during the AKB interval.

In accordance with another feature of the invention, the input of the sampling amplifier is clamped to a reference voltage during a clamping interval preceding the signal sampling interval. The black level representative derived signal is developed during the clamping interval so that the reference voltage to which the amplifier input is clamped during the clamping interval is a function of the magnitude of the derived signal, and the auxiliary signal is developed during the following sampling interval. The auxiliary signal exhibits a magnitude and sense for maintaining the amplifier input voltage substantially unchanged when the magnitude of the derived signal corresponds to the correct black current level.

In accordance with a further feature of the invention, the amplifier input is clamped to a reference voltage during the clamping interval, and the derived signal and the auxiliary signal are both developed during the sampling interval.

Figure 1:
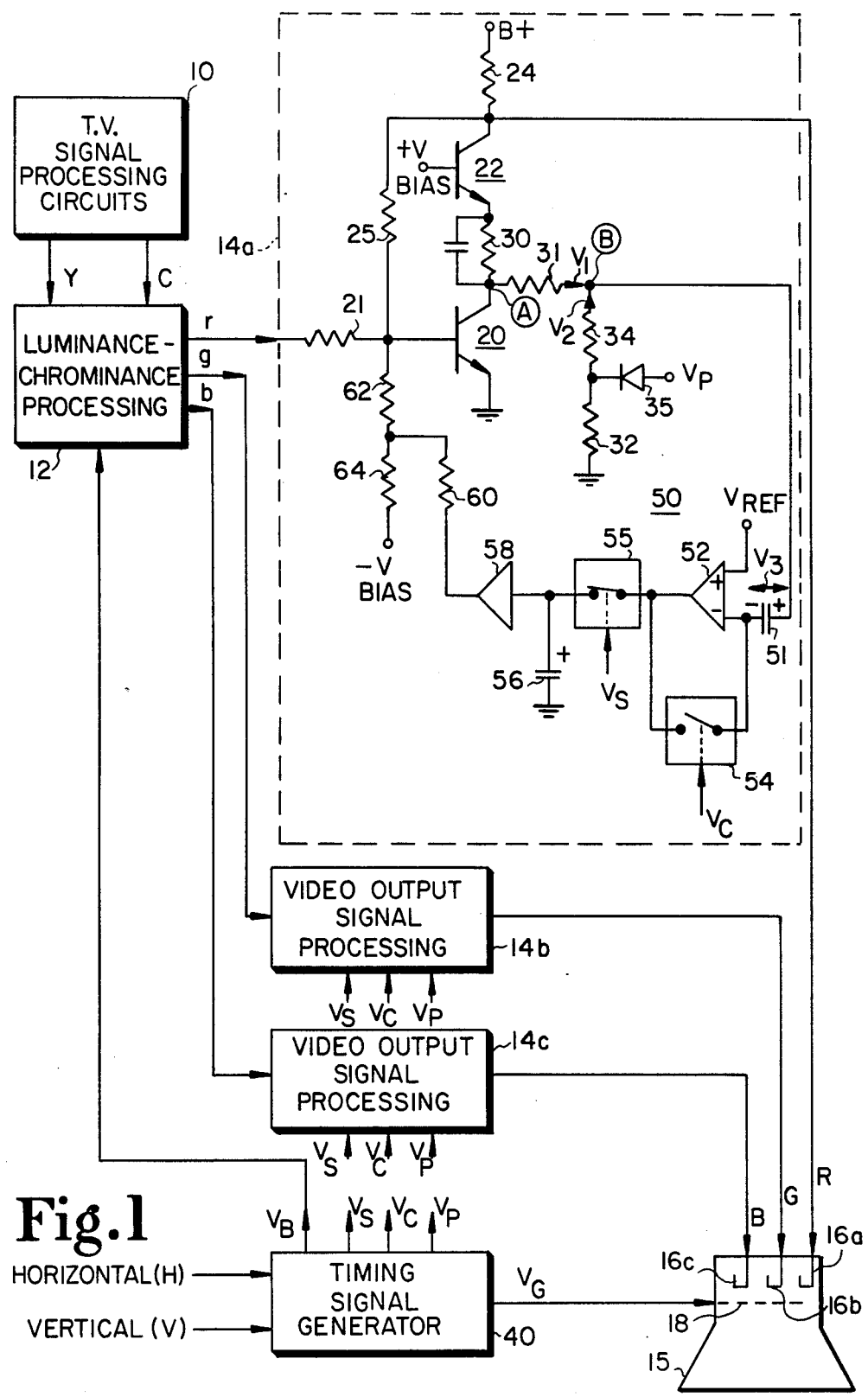
FIG. 1 shows a portion of a color television receiver including an AKB system and an associated signal sampling network incorporating the principles of the present invention.

In FIG. 1, television signal processing circuits 10 provide separated luminance (Y) and chrominance (C) components of a composite color television signal to a luminance-chrominance signal processing network 12. Processor 12 includes luminance and chrominance gain control circuits, DC level setting circuits (e.g., comprising keyed black level clamping circuits), color demodulators for developing r-y, g-y and b-y color difference signals, and matrix amplifiers for combining the latter signals with processed luminance signals to provide low level color image representative signals r, g and b. These signals are amplified and otherwise processed by circuits within video output signal processing networks 14a, 14b and 14c, respectively, which supply high level amplified color image signals R, G and B to respective cathode intensity control electrodes 16a, 16b and 16c of a color kinescope 15. Networks 14a, 14b and 14c also perform functions related to the AKB operation, as will be discussed. Kinescope 15 is of the self-converging in-line gun type with a commonly energized grid 18 associated with each of the electron guns comprising cathode electrodes 16a, 16b and 16c.

Since output signal processors 14a, 14b and 14c are similar in this embodiment, the following discussion of the operation of processor 14a also applies to processors 14b and 14c.

Processor 14a includes a kinescope driver stage comprising an input common emitter transistor 20 which receives video signal r from processor 12 via an input resistor 21, and an output high voltage common base transistor 22 which together with transistor 20 forms a cascode video driver amplifier. High level video signal R, suitable for driving kinescope cathode 16a, is developed across a load resistor 24 in the collector output circuit of transistor 22. An operating supply voltage for amplifier 20, 22 is provided by a source of high DC voltage, B+ (e.g., +230 volts). Direct current negative feedback for driver 20, 22 is provided by means of a resistor 25. The signal gain of cascode amplifier 20, 22 is primarily determined by the ratio of the value of feedback resistor 25 to the value of input resistor 21. The feedback network provides a suitably low amplifier output impedance, and assists to stabilize the DC operating level at the amplifier output.

A sensing resistor 30 DC coupled in series with and between the collector-emitter paths of transistors 20, 22 serves to develop a voltage at a relatively low voltage node A representing the level of kinescope cathode black current conducted during kinescope blanking intervals. Resistor 30 functions in conjunction with the AKB system of the receiver, which will now be described.

A timing signal generator 40 containing logic control circuits responds to periodic horizontal synchronizing rate signals (H) and to periodic vertical synchronizing rate signals (V), both derived from deflection circuits of the receiver, for generating timing signals $V_B$, $V_S$, $V_C$, $V_P$ and $V_G$ which control the operation of the AKB function during periodic AKB intervals. Each AKB interval begins shortly after the end of the vertical retrace interval within the vertical blanking interval, and encompasses several horizontal line intervals also within the vertical blanking interval and during which video signal image information is absent. These timing signals are illustrated by the waveforms in FIG. 2.

Figure 2:
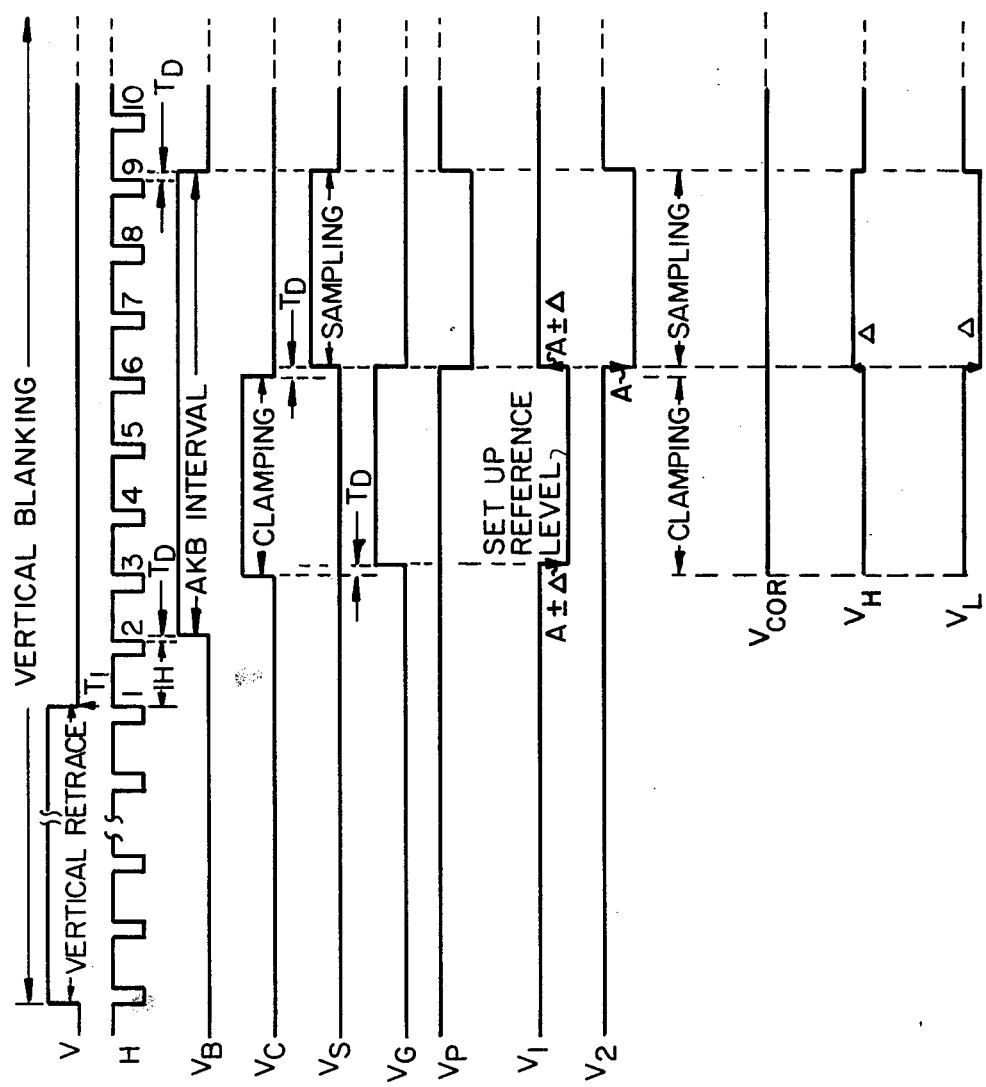
FIG. 2 illustrates signal waveforms associated with the operation of the system in FIG. 1.

Referring to FIG. 2 for the moment, timing signal $V_B$, a video blanking signal, comprises a positive pulse generated soon after the vertical retrace interval ends at time $T_1$, as indicated by reference to signal waveform V. Blanking signal $V_B$ exists for the duration of the AKB interval and is applied to a blanking control input terminal of luminance-chrominance processor 12 for causing the r, g and b outputs of processor 12 to exhibit a black image representative DC reference level corresponding to the absence of video signals. This can be accomplished by reducing the signal gain of processor 12 to substantially zero via the gain control circuits of processor 12 in response to signal $V_B$, and by modifying the DC level of the video signal processing path via the DC level control circuits of processor12 to produce a black image representative reference level at the signal outputs of processor 12. Timing signal $V_G$, a positive grid drive pulse, encompasses three horizontal line intervals within the vertical blanking interval. Timing signal $V_C$ controls the operation of a clamping circuit associated with the signal sampling function of the AKB system. Timing signal $V_S$, a sampling control signal, occurs after signal $V_C$ and serves to time the operation of a sample and hold circuit which develops a DC bias control signal for controlling the kinescope cathode black current level. Signal $V_S$ encompasses a sampling interval the beginning of which is slightly delayed relative to the end of the clamping interval encompassed by signal $V_C$, and the end of which substantially coincides with the end of the AKB interval. A negative-going auxiliary pulse $V_P$, the function of which will be described in greater detail subsequently, coincides with the sampling interval. Signal timing delays $T_D$ indicated in FIG. 2 are on the order of 200 nanoseconds.

Referring again to FIG. 1, during the AKB interval positive pulse $V_G$ (e.g., on the order of +10 volts) forward biases grid 18 of the kinescope, thereby causing the electron gun comprising cathode 16a and grid 18 to increase conduction. At times other than the AKB intervals, signal $V_G$ provides the normal, less positive, bias for grid 18. In response to positive grid pulse $V_G$, a similarly phased, positive current pulse appears at cathode 16a during the grid pulse interval. The amplitude of the cathode output current pulse so developed is proportional to the level of cathode black current conduction (typically a few microamperes).

The induced positive cathode output pulse appears at the collector of transistor 22, and is coupled to the base input of transistor 20 via resistor 25, causing the current conduction of transistor 20 to increase proportionally while the cathode pulse is present. The increased current conducted by transistor 20 causes a voltage to be developed across sensing resistor 30. This voltage is in the form of a negative-going voltage change which appears at sensing node A and which is proportional in magnitude to the magnitude of the black current representative cathode output pulse. The magnitude of the voltage change at node A is determined by the product of the value of resistor 30 times the magnitude of the current flowing through resistor 30.

The voltage change at node A is coupled via a small resistor 31 to a node B at which a voltage change $V_1$, essentially corresponding to the voltage change at node A, is developed. Node B is coupled to a bias control voltage processing network 50. Network 50 includes an input coupling capacitor 51, an input clamping and sampling operational amplifier 52 (e.g., an operational transconductance amplifier) with an associated feedback switch 54 responsive to clamping timing signal $V_C$, and a charge storage capacitor 56 with an associated switch 55 responsive to sampling timing signal $V_S$. The voltage developed on capacitor 56 is used to supply a kinescope bias correction signal via network 58 and resistor network 60, 62, 64 to the kinescope driver via a bias control input at the base of transistor 20. Network 58 includes signal translating and buffer circuits for supplying the bias control voltage at a suitable level and low impedance in accordance with the bias control input requirements of transistor 20.

The operation of the system of FIG. 1 will now be discussed with specific reference to the waveforms of FIG. 2. Auxiliary signal $V_P$ is applied to circuit node B in FIG. 1 via a diode 35 and a voltage translating impedance network comprising resistors 32 and 34, e.g., with values of 220 kilohms and 270 kilohms, respectively. Signal $V_P$ exhibits a positive DC level of approximately +8.0 volts at all times except during the AKB sampling interval, for maintaining diode 35 conductive so that a normal DC bias voltage is developed at node B. When the positive DC component of signal $V_P$ is present, the junction of resistors 32 and 34 is clamped to a voltage equal to the positive DC component of signal $V_P$, minus the voltage drop across diode 35. Signal $V_P$ manifests a negative-going, less positive fixed amplitude pulse component during the AKB sampling interval. Diode 35 is rendered non-conductive in response to negative pulse $V_P$, causing both resistors 32 and 34 to be coupled between node B and ground. Resistor 31 causes insignificant attenuation of the voltage change developed at node A relative to the corresponding voltage change developed at node B since the value of resistor 31 (on the order of 200Ω) is small relative to the values of resistors 32 and 34.

Prior to the clamping interval, but during the AKB interval, the pre-existing nominal DC voltage ($V_{NOM}$) appearing at node B charges the positive terminal of capacitor 51. During the clamping interval when grid drive pulse $V_G$ is developed, the voltage at node A decreases in response to pulse $V_G$ by an amount representative of the black current level. This causes the voltage at node B to decrease to a level substantially equal to $V_{NOM}-V_1$. Also during the clamping interval, timing signal $V_C$ causes clamping switch 54 to close (i.e., conduct) whereby the inverting (−) signal input of amplifier 52 is coupled to its output, thereby configuring amplifier 52 as a unity gain follower amplifier. As a result, a source of fixed DC reference voltage $V_{REF}$ (e.g., +5 volts) applied to a non-inverting input (+) of amplifier 52 is coupled by feedback action to the inverting signal input of amplifier 52 via the output of amplifier 52 and conductive switch 54. Thus during the clamping interval the voltage $V_3$ across capacitor 51 is a function of a reference set-up voltage determined by voltage $V_{REF}$ at the negative terminal of capacitor 51, and a voltage at the positive terminal of capacitor 51 corresponding to the difference between the described pre-existing nominal DC level ($V_{NOM}$) at node B and voltage change $V_1$ developed at node B during the clamping interval. Thus voltage $V_3$ across capacitor 51 during the clamping reference interval is a function of the level of black current representative voltage change $V_1$, which may vary. Voltage $V_3$ can be expressed as $(V_{NOM}-V_1)-V_{REF}$.

During the immediately following sampling interval, positive grid drive pulse $V_G$ is absent, causing the voltage at node B to increase positively to the pre-existing nominal DC level $V_{NOM}$ that appeared prior to the clamping interval. Simultaneously, negative pulse $V_P$ appears, reverse biasing diode 35 and perturbing (i.e., momentarily changing) the normal voltage translating and coupling action of resistors 32, 34 such that the voltage at node B is reduced by an amount $V_2$ as indicated in FIG. 2. At the same time, clamping switch 54 is rendered non-conductive and sampling switch 55 closes (conducts) in response to signal $V_S$ whereby charge storage capacitor 56 is coupled to the output of amplifier 52.

Thus during the sampling interval the input voltage applied to the inverting signal input (−) of amplifier 52 is equal to the difference between the voltage at node B, and voltage $V_3$ across input capacitor 51. The input voltage applied to amplifier 52 is a function of the magnitude of voltage change $V_1$, which can vary with changes in the kinescope black current level.

The voltage on output storage capacitor 56 remains unchanged during the sampling interval when the magnitude of voltage change $V_1$ developed during the clamping interval equals the magnitude of voltage change $V_2$ developed during the sampling interval, indicating a correct kinescope black current level. This results because during the sampling interval, voltage change $V_1$ at node B increases in a positive direction (from the clamping set-up reference level) when the grid drive pulse is removed, and voltage change $V_2$ causes a simultaneous negative-going voltage perturbation at node B. When kinescope bias is correct, positive-going voltage change $V_1$ and negative-going voltage change $V_2$ exhibit equal magnitudes whereby these voltage changes mutually cancel during the sampling interval, leaving the voltage at node B unchanged.

When the magnitude of voltage change $V_1$ is less than the magnitude of voltage change $V_2$, amplifier 52 proportionally charges storage capacitor 56 in a direction for increasing cathode black current conduction. Conversely, amplifier 52 proportionally discharges storage capacitor 56 for causing decreased cathode black current conduction when the magnitude of voltage change $V_1$ is greater than the magnitude of voltage change $V_2$.

As more specifically shown by the waveforms of FIG. 2, the amplitude "A" of voltage change $V_1$ is assumed to be approximately three millivolts when the cathode black current level is correct, and varies over a range of a few millivolts (±Δ) as the cathode black current level increases and decreases relative to the correct level as the operating parameters of the kinescope change. Thus the clamping interval set-up reference voltage across capacitor $V_3$ varies with changes in the magnitude of voltage $V_1$ as the cathode black current level changes. Voltage change $V_2$ at node B exhibits an amplitude "A" of approximately three millivolts, which corresponds to amplitude "A" associated with voltage change $V_1$ when the black current level is correct.

As indicated by waveform $V_{COR}$ in FIG. 2, the voltage at the inverting input of amplifier 52 remains unchanged during the sampling interval when voltages $V_1$ and $V_2$ are both of amplitude "A". However, as indicated by waveform $V_H$, the input voltage of amplifier 52 increases by an amount Δ when voltage change $V_1$ exhibits amplitude "A+Δ", corresponding to a high black current level. In this event amplifier 52 discharges output storage capacitor 56, so that the bias control voltage applied to the base of transistor 20 causes the collector voltage of transistor 22 to increase, whereby the cathode black current decreases towards the correct level.

Conversely, and as indicated by waveform $V_L$, the input voltage of amplifier 52 decreases by an amount Δ during the sampling interval when voltage change $V_1$ exhibits amplitude "A−Δ", corresponding to a low black current level. In this case amplifier 52 charges output storage capacitor 56, causing the collector voltage of transistor 22 to decrease whereby the cathode black current increases toward the correct level. In either case, several sampling intervals may be required to achieve the correct black current level.

The voltage developed at node B during the AKB clamping and sampling intervals is a function of the values of resistors 31, 32 and 34, and the value of an output impedance, $Z_o$, appearing at node A. When signal $V_P$ manifests the positive DC level (+8 volts) during the clamping interval, the junction of resistors 32 and 34 is voltage clamped and a current conducted by resistor 31 from node A to node B is a function of the values of $Z_o$, resistor 31 and resistor 34. During the subsequent sampling interval when the negative-going pulse component of signal $V_P$ is present, diode 35 is non-conductive and the junction of resistors 32 and 34 is unclamped. At this time a different current is conducted by resistor 31 from node A to node B as a function of the value of resistor 32, in addition to the values of $Z_o$ and resistors 31, 34. Voltage change $V_2$ developed at node B in response to the negative-going pulse component of signal $V_P$ is proportional to the difference between these currents.

Impedance $Z_o$ at node A may vary undesirably as a function of the kinescope cathode bias level (i.e., cathode cut-off voltage level) associated with the expected correct cathode black current level. Resistor 31 compensates for variations in the value of impedance $Z_o$, and also serves to increase the immunity of the clamping and sampling circuits of network 50 to locally generated spurious signals such as horizontal rate interference. These functional aspects of resistor 31 are discussed in a concurrently filed copending U.S. patent application (RCA Ser. No. 78,456) of J. C. Tallant, II, et al. titled "Automatic Kinescope Bias Control System Compensated for Sense Point Impedance Variations."

The disclosed system automatically produces a zero amplifier output current to storage capacitor 56 when the non-zero amplitude of voltage change $V_1$ corresponds to the correct black current level. Accordingly, manual pre-set bias controls are not required for offsetting the sampling amplifier conduction response to produce a zero amplifier output current flow to the storage capacitor when the sampled signal exhibits a magnitude other than zero for correct bias conditions.

The described sampling amplifier input signal coupling arrangement employing auxiliary pulse $V_P$ is advantageous in a system wherein sampling amplifier 52 comprises a differential input amplifier, such as an emitter coupled differential amplifier as will be described subsequently in connection with FIG. 4. A differential amplifier of this type exhibits a symmetrical input-verus-output signal transfer response which is non-linear over much of its operating range. The otherwise symmetrical operating range of the differential amplifier can be rendered asymmetrical if the bias of the amplifier is offset by means of a manually adjustable pre-set bias control, for example. In such case the amplifier would be more likely to produce an output which is contaminated by the effects of noise and similar spurious signals, since the offset asymmetrical amplifier response can lead to rectification of the noise in the non-linear operating region of the amplifier. As a result, the output signal sample and the corresponding voltage developed on the output charge storage device would be distorted or obscured by the effects of rectified noise.

The described combined-pulse sampling arrangement also advantageously provides a convenient mechanism for compensating for mutually different conduction (gain) characteristics and correspondingly different cut-off voltages of the kinescope electron guns, due to kinescope manufacturing tolerances, for example. This aspect of the disclosed arrangement is discussed in detail in my copending concurrently filed U.S. patent application Ser. No. (RCA 78,859) titled "Automatic Kinescope Bias Control System Compensated for Kinescope Electron Gun Conduction Dissimilarities", and is discussed briefly below.

When the kinescope electron guns are identical and thereby exhibit the same conduction characteristics, they will conduct equal black level currents and exhibit equal cut-off voltages (i.e., grid-to-cathode voltage). In practice, however, the electron guns exhibit mutually different conduction characteristics. In the latter case the different currents conducted by the electron guns are considered to be the correct black level currents, whereby the AKB system should remain quiescent and should not alter the kinescope bias even though the electron guns exhibit mutually different black current levels and mutually different associated cut-off voltages.

This result is achieved by the disclosed arrangement since the magnitude of voltage change $V_2$ developed at node B is linearly proportional to the DC voltage component appearing at node A. This DC voltage component is proportional to the cathode cut-off voltage as manifested by the DC voltage component at the output of driver transistor 22, corresponding to the cathode voltage, during the AKB interval (neglecting the effect of the induced cathode output current pulse developed in response to positive grid drive pulse $V_G$). Thus if the three kinescope electron guns exhibit mutually different currents and cut-off voltages corresponding to initial black level set-up conditions, voltage change $V_2$ respectively associated with signal processors 14a, 14b and 14c each exhibit different magnitudes, even though each is derived from a common signal $V_P$. The different magnitudes of voltage changes $V_2$ are a function of the different cut-off voltages as manifested by the DC components of different magnitudes developed at nodes A. The different magnitudes of voltage changes $V_2$ are such that, for the associated AKB control loop, the voltage developed at node B does not change when voltage changes $V_1$ and $V_2$ are combined, so that each AKB control loop remains quiescent. The AKB control loops will remain quiescent until the initially established black level electron gun currents change due to a change in the operating parameters of the kinescope because of kinescope aging or temperature effects.

Figure 3:
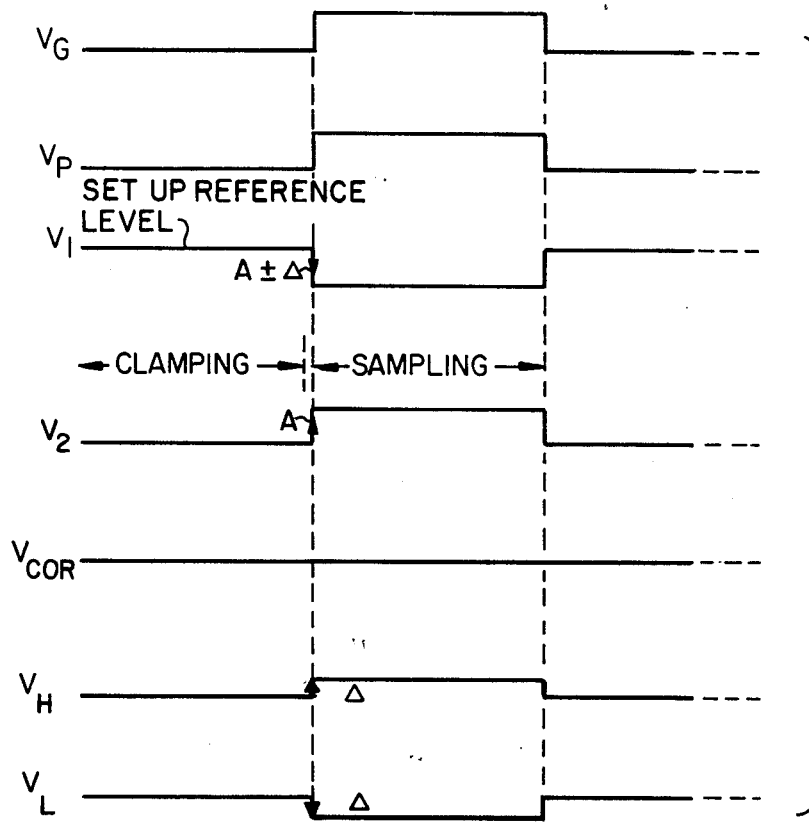
FIG. 3 depicts an alternative version of signal waveforms shown in FIG. 2.

In some AKB systems it may be desirable to develop black current representative voltage change $V_1$ during the sampling interval, rather than during the preceding clamping interval as described previously. In such an alternative system grid drive pulse $V_G$ would be timed to occur during the sampling interval, and signal timing relationships as shown by the waveforms of FIG. 3 can be employed. In such a system the timing of signals V, H, $V_B$, $V_S$ and $V_C$ would remain unchanged.

Waveforms for the alternative system are shown in FIG. 3. A positive grid drive pulse $V_G$ and a positive auxiliary pulse $V_P$ are coincident during the sampling interval. During the initial clamping interval, the "set-up reference level" is a function of the DC voltage then appearing at nodes A and B. During the subsequent sampling interval, voltage change $V_1$ exhibits an amplitude "A" when the black current level is correct, amplitude $A+\Delta$ when the black current level is low, and amplitude $A-\Delta$ when the black current level is high. Voltage change $V_1$ is summed during the sampling interval with voltage change $V_2$, of amplitude "A". Thus when the black current level is correct, voltage change $V_1$ cancels with voltage change $V_2$ since both then exhibit the same amplitude "A" but with opposite polarity. The voltage then applied to clamp capacitor 51 from node B is therefore the same as the reference level applied from node B during the prior clamping interval, whereby the input voltage of amplifier 52 does not change during the sampling interval, as indicated by signal waveform VCOR for the correct current condition. Thus storage capacitor 56 is neither charged nor discharged by output current from amplifier 52. For this alternative system, voltage change $V_2$ can be developed at node B by selectively gating a voltage divided version of positive pulse $V_P$ to node B during the sampling intervals.

The clamping reference level developed during the clamping interval for conditions of low and high black current is the same as the clamping reference level developed when the black current level is correct. However, in the case of high black current, voltage changes $V_1$ and $V_2$ do not cancel completely during the sampling interval, and the input voltage of amplifier 52 increases by an amount $\Delta$ during the sampling interval (waveform $V_H$). Conversely, a condition of black current results in incomplete cancellation whereby the input voltage to amplifier 52 decreases by an amount A during the sampling interval (waveform $V_L$).

Figure 4:
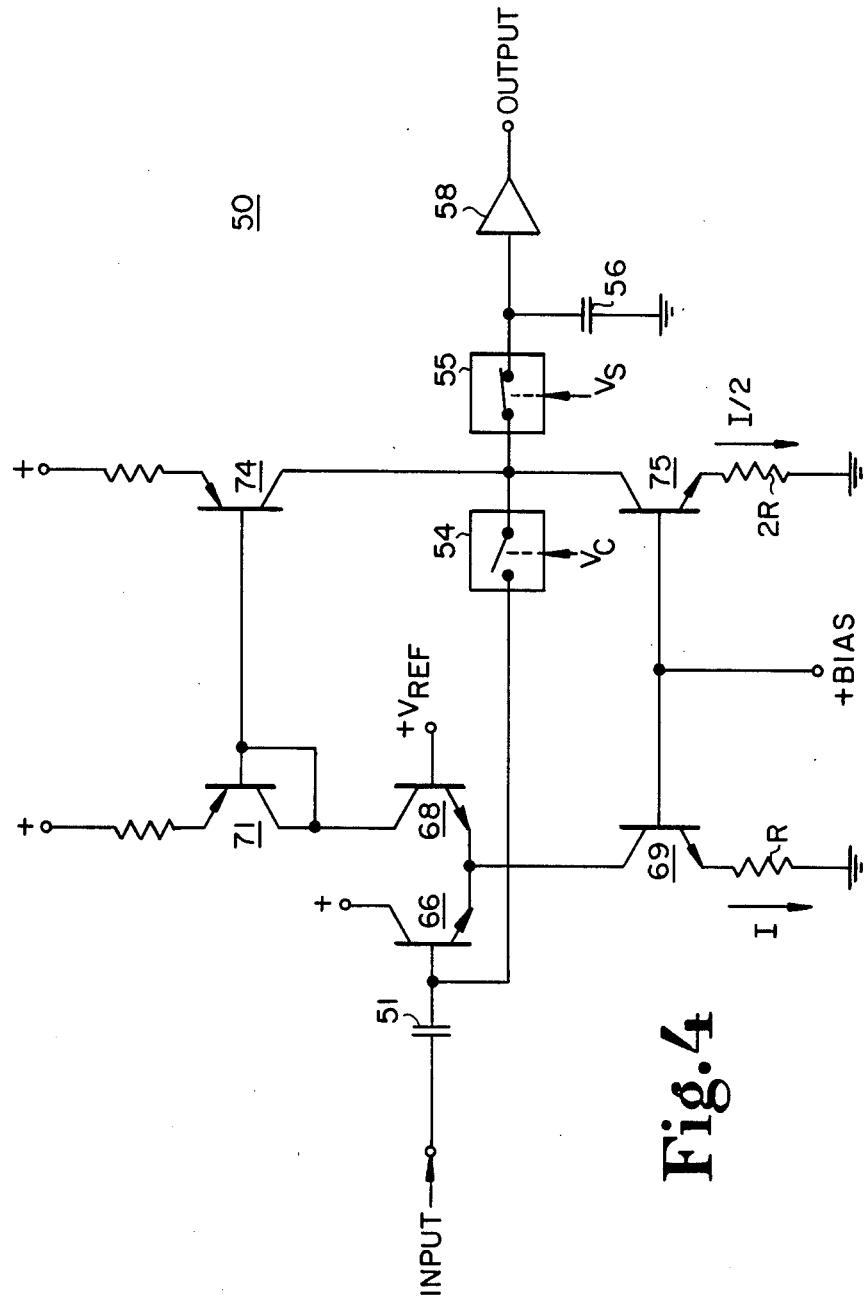
FIG. 4 shows circuit details of the sampling network in FIG. 1.

FIG. 4 shows circuit details of signal clamping and sampling network 50 of FIG. 1, wherein corresponding elements are identified by the same reference number.

In FIG. 4, amplifier 52 is shown as comprising an operational transconductance amplifier wherein an output current is produced as a function of the product of the amplifier input voltage and the amplifier transconductance ($g_m$) Amplifier 52 includes emitter coupled transistors 66, 68 arranged in an input differential amplifier configuration, and a current repeater ("mirror") network, including a diode connected transistor 71 and a transistor 74, arranged in the collector circuit of transistor 68 as shown. A first constant current source including a forward biased transistor 69 and a resistor R provides an operating current I for transistors 66 and 68. A second constant current source including a forward-biased transistor 75 and a resistor 2R provides an operating current I/2 for transistor 74. DC reference voltage source $V_{REF}$ is applied to the non-inverting input of amplifier 52 at the base of transistor 68. The input signal to be sampled (as derived from node B in FIG. 1) is applied via input capacitor 51 to the inverting input of amplifier 52 at the base of transistor 66.

During the AKB clamping interval, the collector of transistor 68 is coupled to input capacitor 51 via diode connected transistor 71, transistor 74, and conductive switch 54 to form a negative feedback current path. At this time, storage capacitor 56 is decoupled from amplifier 52 via non-conductive switch 55. Input capacitor 51 charges via currents conducted by transistors 68, 71 and 74, as a function of $V_{REF}$ and the potential then applied to the input of capacitor 51 from node B of FIG. 1, until the base voltages of transistors 66 and 68 are substantially equal (i.e., the differential input voltage of amplifier 52 is substantially zero). Current I sourced by transistor 69 then divides equally between transistors 66 and 68, whereby the collector currents of transistors 68 and 74 equal the collector current (I/2) conducted by transistor 75. Therefore all of the collector current conducted by transistor 74 flows as collector current in transistor 75. The described current feedback path settles to a zero current condition prior to the end of the clamping interval, at which time transistor 75 "sinks" all of the collector current of transistor 74 and zero feedback current flows to the base of input transistor 66.

During the subsequent AKB sampling interval when switch 54 is rendered non-conductive and switch 55 conducts to couple storage capacitor 56 to the output of amplifier 52, the pre-existing charge on capacitor 56 remains unchanged unless the input signal applied to capacitor 51 is sufficient to alter the balanced base bias of transistors 66, 68 as established during the preceding clamping interval. Thus when voltage change $V_1$ exhibits amplitude "A", corresponding to a correct black level current condition, the voltage input to transistor 66 will remain unchanged as indicated by waveform $V_{COR}$ of FIG. 2. Accordingly, the balanced input bias of transistors 66, 68 and the charge on output storage capacitor 56 remain unchanged. When the black current level is incorrect such that the voltage input to transistor 66 is caused to increase as shown by waveform $V_H$ of FIG. 2, the currents conducted by transistors 68, 71 and 74 decrease whereby storage capacitor 56 is discharged via transistor 75 by an amount proportional to the decreased conduction of transistor 74 in response to the increased input voltage. In this case transistor 75 acts as a current sink with respect to discharging storage capacitor 56. Similarly, a decrease in the input voltage applied to transistor 66 (as indicated by waveform $V_L$ of FIG. 2) causes a corresponding increase in the collector current of output transistor 74. Storage capacitor 56 charges via transistor 74 in response to this increased current conduction, whereby the voltage on capacitor 56 increases. In this case transistor 74 acts as a current source for charging capacitor 56.

Figure 5:
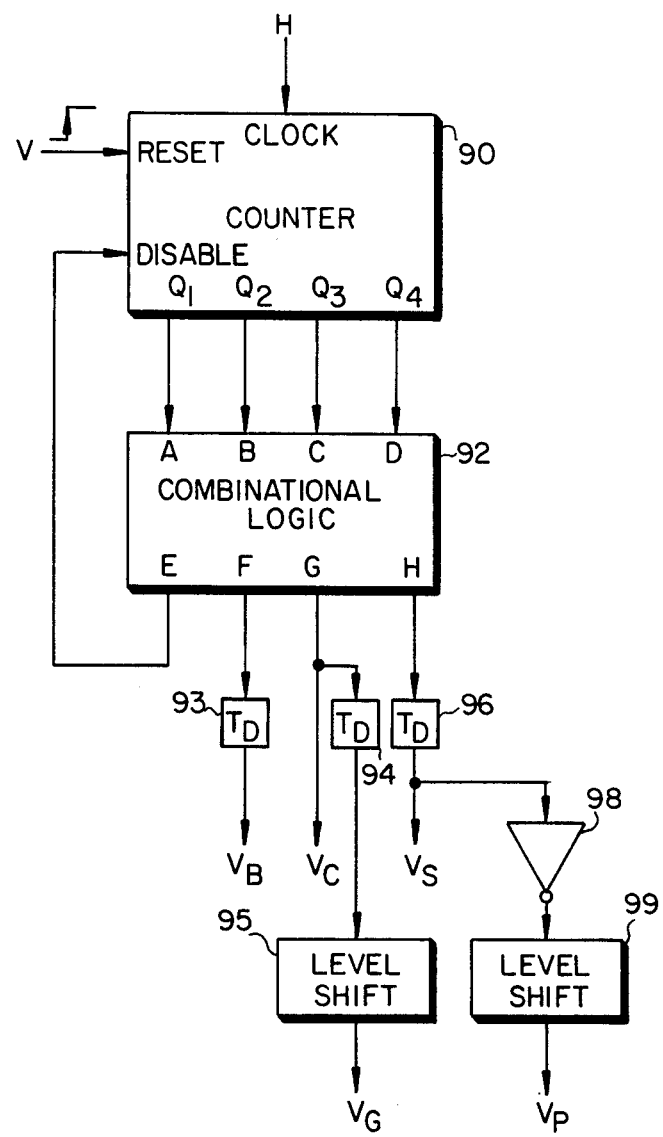
FIG. 5 shows circuit details of a timing signal generator associated with the system of FIG. 1.

FIG. 5 shows a block diagram of a logic arrangement for timing signal generator 40 in FIG. 1. A binary counter 90 includes CLOCK and RESET inputs respectively responsive to horizontal signal H and vertical signal V, a DISABLE input, and binary outputs $Q_1$–$Q_4$. Counter 90 is reset in response to the positive pulse portion of signal V which occurs during the vertical retrace interval, so that outputs $Q_1$–$Q_4$ all exhibit a low logic level (0000) while the RESET input is positive during the vertical retrace interval. During this time counter 90 does not respond to horizontal rate clock pulses H.

A combinational logic array 92 (e.g., including a plurality of logic gates) monitors the binary states of the $Q_1$–$Q_4$ outputs of counter 90 via inputs A–D. At the end of the vertical retrace interval at time $T_1$, counter 90 is enabled to operate whereby the logic states of the outputs of counter 90 change to indicate a binary number corresponding to the number of clock pulses H occurring since the end of the vertical retrace interval.

A logic output F of array 92 produces a high ("1") logic level during the interval encompassing the second through eighth clock pulses H, by sensing the expected condition of counter outputs $Q_1-Q_4$ during this interval. This signal is delayed by a delay network 93 to produce delay $T_D$ whereby AKB timing signal $V_B$ is developed at the output of delay network 93. The delay produced by network 93 can be produced, for example, by a plurality of series coupled logic gates, each providing a given delay.

Timing signal $V_C$ is developed at output G of array 92 during the interval including the third through the fifth clock pulses H. This signal is delayed by an amount $T_D$ via a network 94 and level shifted via a network 95 to produce grid drive pulse $V_G$. Level shifting network 95 (e.g., a voltage translator) serves to produce signal $V_G$ with an amplitude suitable for driving the kinescope grid electrode.

A logic output H of array 92 produces a high ("1") logic level during the interval encompassing the sixth through the eighth clock pulses H from the end of the vertical retrace interval. Network 96 delays this signal by amount $T_D$ to develop timing signal $V_S$. Auxiliary pulse $V_P$ is derived from signal $V_S$ by means of a signal inverter 98 and a level shifter 99, the latter serving to produce a pulse amplitude suitable for application to resistor network 32, 34 of FIG. 1. Output E of array 92 provides a control signal to the DISABLE input of counter 90 after the AKB interval ends (i.e., at the beginning of the ninth clock pulse H) to inhibit the counting process.

What is claimed is:

1. In a video signal processing system including an image reproducing device responsive to video signals supplied to an intensity control electrode thereof, automatic bias control apparatus comprising:

means for deriving a periodic signal representative of the black current level conducted by said intensity control electrode during video signal image blanking intervals, said derived signal having a magnitude other than zero when said black current level is correct;

information storage means;

amplifier means with a signal input, and an output coupled to said storage means for modifying the information content of said storage means in accordance with the conductive condition of said amplifier means in responsive to applied input signals;

input signal coupling means for coupling said derived signal to said amplifier input;

means for providing a periodic auxiliary signal to said input signal coupling means with a magnitude and sense for substantially negating the response of said amplifier to the magnitude of said derived signal when the magnitude of said derived signal is representative of a correct black current level; and means for supplying a bias correction voltage derived from said storage means to said image reproducing device for maintaining a correct black current level.

2. Apparatus according to claim 1 and further comprising:

impedance means coupled to said input signal coupling means for establishing a bias for said input signal coupling means in the presence of said derived signal; and wherein said auxiliary signal is applied to said impedance means for modifying said established bias with a sense for producing said negated amplifier response.

3. Apparatus according to claim 1 wherein said auxiliary signal cancels said derived signal in said input signal path to produce said negated amplifier response.

4. Apparatus according to claim 3, wherein said derived and auxiliary signals comprise coincident pulses of mutually opposite polarity, and substantially equal magnitude when said derived signal is representative of a correct black current level.

5. Apparatus according to claim 1, wherein said auxiliary signal exhibits a magnitude proportional to a DC voltage component manifested by said intensity control electrode during said blanking intervals.

6. Apparatus according to claim 1 and further comprising clamping means coupled to said input signal coupling means at said amplifier input;

switching means coupled to said amplifier output, to said clamping means, and to said storage means;

means for rendering said switching means operative during an initial clamping interval for (1) clamping said amplifier input to a reference voltage in response to a reference source coupled to said amplifier input during said clamping interval, and (2) decoupling said amplifier output from said storage means; and to render said switching means operative during a following sampling interval for (3) unclamping said amplifier input, and (4) coupling said amplifier output to said storage means; and wherein said derived black current representative signal is developed during said clamping interval and coupled to said clamping means so that said reference voltage to which said amplifier input is clamped is additionally a function of the magnitude of said derived signal; and said auxiliary signal is developed during said following sampling interval.

7. Apparatus according to claim 6, wherein said clamping means comprises a capacitor for coupling signals from said input coupling means to said amplifier input, and the voltage developed across said capacitor during said clamping interval is a function of the magnitude of said derived signal; and said auxiliary signal exhibits a magnitude and sense for maintaining the voltage at said amplifier input substantially unchanged, when the magnitude of said derived signal is representative of a correct black current level.

8. Apparatus according to claim 7, wherein said image reproducing device is a kinescope including an electron gun comprising a grid electrode and an associated cathode intensity control electrode;

said automatic bias control apparatus further includes means for biasing said kinescope electron gun during said clamping interval to induce a cathode output signal with a magnitude proportional to the level of cathode black current; and said deriving means derives said periodic representative signal from said induced cathode output signal.

9. Apparatus according to claim 1 and further comprising:
 clamping means coupled to said input signal coupling means at said amplifier input;
 switching means coupled to said amplifier output, to said clamping means, and to said storage means;
 means for rendering said switching means operative during an initial clamping interval for (1) clamping said amplifier input to a reference voltage in response to a reference source coupled to said amplifier input during said clamping interval, and (2) decoupling said amplifier output from said storage means; and to render said switching means operative during a following sampling interval for (3) unclamping said amplifier input, and (4) coupling said amplifier output to said storage means; and wherein
 said derived black current representative signal and said auxiliary signal are both developed during said sampling interval.

10. Apparatus according to claim 9, wherein
 said clamping means comprises a capacitor for coupling signals from said input coupling means to said amplifier input; and
 said auxiliary signal exhibits a magnitude and sense for maintaining the voltage at said amplifier input substantially unchanged, when the magnitude of said derived signal is representative of a correct black current level.

11. Apparatus according to claim 10, wherein
 said image reproducing device is a kinescope including an electron gun comprising a grid electrode and an associated cathode intensity control electrode;
 said automatic bias control apparatus further includes means for biasing said kinescope electron gun during said sampling interval to induce a cathode output signal with a magnitude proportional to the level of cathode black current; and
 said deriving means derives said periodic representative signal from said induced cathode output signal.

12. Apparatus according to claim 1, wherein
 said amplifier means comprises a differential input amplifier.

13. In a video signal processing system including an image reproducing device responsive to video signals supplied to an intensity control electrode thereof, automatic bias control apparatus comprising:
 means for deriving a periodic signal representative of the black current level conducted by said intensity control electrode during video signal image blanking intervals, said derived signal having a magnitude other than zero when said black current level is correct;
 a capacitor;
 means for coupling said derived signal to said capacitor to alter its charge;
 means for providing a periodic auxiliary signal to said capacitor to alter its charge; said auxiliary signal having a magnitude and sense for substantially negating the altered charge of said capacitor developed in response to said derived signal when the magnitude of said derived signal is representative of a correct black current level; and
 means for supplying a bias correction voltage to said image reproducing device for maintaining a correct black current level in response to the charge on said capacitor.

14. Apparatus according to claim 13, wherein
 said auxiliary signal exhibits a magnitude as a function of a DC voltage component manifested by said intensity control electrode during said blanking intervals.

* * * * *